United States Patent Office 3,389,120
Patented June 18, 1968

3,389,120
POLYOLEFINS STABILIZED WITH
PHENOLIC ESTERS
Alfred R. Globus, Long Island City, N.Y., assignor to
Guardian Chemical Corporation, Long Island City,
N.Y., a corporation of Delaware
No Drawing. Filed Aug. 19, 1965, Ser. No. 481,083
5 Claims. (Cl. 260—45.85)

ABSTRACT OF THE DISCLOSURE

A novel class of compounds, their use in stabilizing polyolefins and stabilized polyolefins are disclosed. The compounds are characterized by the formula:

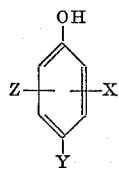

wherein X represents a fatty acid radical having 14 to 20 carbon atoms and such hydroxyl group substituted fatty acids, Y represents lower alkyl and Z represents lower alkyl containing 3 to 5 carbon atoms, X and Z being positioned either ortho or meta with respect to the phenolic hydroxy group.

---

This invention relates to polyolefin plastics. It more particularly relates to polyolefin plastics having added thereto a material which is a stabilizer against ultra-violet radiation, a plasticizer, and an anti-oxidant.

Polyolefin resins are quite well known. As a group, these polymers are exemplified by polyethylene, polypropylene, polybutene-1, polystyrene, and other substantially hydrocarbon polymers. Also included in this group of polymers are materials having a hydrocarbon backbone with various substituent groups opening from this hydrocarbon chain as, for example, polyvinylchloride, polyvinylidene chloride, polyvinyl acetate, polyvinyl alcohol, polyacrylic acid, polymethacrylic acid, polyacrylates (methyl, ethyl, butyl, octyl, etc.), polymethacrylates (methyl, ethyl, butyl, octyl, etc.), polyacrylonitrile, polymers of maleic, fumaric, and itaconic acid and their esters (methyl, ethyl, butyl, octyl, etc.). Further included in the general term "polyolefins" are co, ter, quad, and higher interpolymers made up of various olefinically unsaturated monomers. As used in this specification and in the claims appended hereto, the term "polyolefin" is intended to include all of the permutations and combinations of mer units in a polymer whose backbone or chain is substantially hydrocarbon in nature.

While polyolefins have been known for some time it has also been known that these materials in their virgin state often have undesirable properties; for example, it is known that polyvinylchloride is a brittle material in its unplasticized form. Further, most polyolefins are subject to ultra-violet radiation attack as well as oxidative degradative attack. Thus, it has been necessary to include in polyolefin compositions various substances to impart to the finished composition properties suited to the intended use, e.g., flexibility in polyvinyl chloride shower curtains or light and oxygen stability in polyolefin garden hose.

It is, therefore, an object of this invention to provide a novel class of compounds which have utility as additives for polyolefin compositions.

It is another object of this invention to provide a novel plasticized polyolefin.

It is a further object of this invention to provide a novel ultra-violet light stabilized polyolefin.

It is a still further object of this invention to provide a polyolefin composition containing a novel anti-oxidant.

In accord with, and fulfilling these objects, one aspect of this invention resides in a novel class of compounds corresponding to the structural formula:

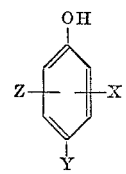

wherein X is selected from the group consisting of saturated acids having about 14 to 20 carbon atoms and which acids are normally solids, Y is selected from the group consisting of lower alkyl hydrocarbons, and Z is selected from the group of lower hydrocarbons having at least about 3 carbon atoms therein. X and Z are positioned either ortho or meta with respect to the phenolic hydroxy group.

More particularly, the X substituent is preferably selected from the group consisting of stearic, palmitic, arachidic, myristic acids, their hydroxy substituted equivalents or esters of these acids. The Y substituent preferably contains up to about 6 carbon atoms, and most preferably Y is methyl or ethyl. The Z substituent preferably contains about 3 to 5 carbon atoms and is most preferably butyl.

One particular attribute of the stabilizers of the instant invention is that they are substantially non-toxic and, accordingly, lend themselves to applications where this is of critical importance. Such an application, for example, would be in the food and drug packaging fields.

Generally speaking, the novel phenol of the instant invention can be made by alkylating a substituted ethyl or methyl phenol (the substituent being a highly reactive group) so as to introduce the Z substituent thereon in the known manner. The last substituent to be introduced is the fatty acid. This is substituted on the ring in the known manner, replacing the highly reactive group. The critical feature is to be sure that the last group introduced is that corresponding to the fatty acid as, for instance, the stearic acid moiety.

It is preferred to use the compounds of this invention in stabilizing or plasticizing proportions in admixture with polyolefin resins. The resin and the stabilizer are blended in the usual manner, e.g., in a Banbury two-roll mill or other similar device well known to the art. It is preferred to incorporate about 0.1 to 1 wt. percent of the stabilizer based upon the total weight of polyolefin. Most preferred is the use of 0.25 wt. percent stabilizer based upon the polyolefin as, for example, 0.25 wt. percent of stabilizer, in accordance with the invention, incorporated into polypropylene.

The following examples are given by way of illustration and are in on way limiting upon the scope of the invention. Parts and percentages are by weight unless expressly stated to the contrary.

Example 1.—As a compound, stearic-substituted phenol 1 mol ethyl butyl phenol substituted in the ortho position with a highly reactive substituent (it is not necessary to start with the ethyl phenol and to subject the same to alkylation to form the corresponding ethyl butyl phenol since the latter is readily available) is treated with 2 mols of sodium stearate ($C_{17}H_{35}COONa$) in an inert solvent under increased temperature and pressure; m-carboxy stearyl, p-ethyl, o-butyl phenol is recovered in the form of its ester and in the conventional manner is converted into the corresponding free compound.

Example 2.—Hydroxy-stearic-substituted phenols 1 mol methyl butyl phenol substituted in the ortho position with a highly reactive substituent (it is not necessary to start with the methyl phenol and to subject the same to alkylation to form the corresponding methyl butyl phenol since the latter is readily available) is treated with 2 mols of sodium hydroxy stearate ($C_{18}H_{35}O_3Na$) in an inert solvent under increased temperature and pressure; m-hydroxy carboxy stearyl, p-methyl-m-butyl phenol is recovered in the form of its ester and in the conventional manner is converted into the corresponding free compound.

Examples III and IV

The products prepared in Examples 1 and 2 were mixed with polypropylene in a proportion of 0.25% based upon the weight of the polypropylene. The resulting batch was further worked to produce a thin film highly serviceable because of its unique properties for wrapping food and/or pharmaceutical products.

A gram sample of each mixture was subjected to ultraviolet radiation for 90 days equivalent to tropical daylight. When composed with an untreated polypropylene, the untreated polypropylene was observed to be dark, almost black in color, brittle, fracturing on application of pressure while the polypropylene treated samples were still transparent, colorless to pale yellow, and had lost less than 25% of their resistance to impact or pressure.

What is claimed is:

1. A composition comprising a polyolefin in admixture with about 0.1 to 1 wt. percent of a compound according to the formula:

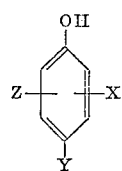

wherein X is a member selected from the group consisting of fatty acid radicals having 14 to 20 carbon atoms and hydroxy substituted fatty acid radicals having 14 to 20 carbon atoms, Y is lower alkyl and Z is lower alkyl, wherein X and Z are positioned either ortho or meta with respect to the phenolic hydroxy group as stabilizer.

2. A composition according to claim 1 wherein said compound is present in an amount of about 0.25 wt. percent.

3. A composition according to claim 1 wherein said compound is o-stearylcarboxy-p-methyl-m-propylphenol.

4. A composition according to claim 1 wherein said compound is o-stearylcarboxy-p-ethyl-m-amylphenol.

5. A composition according to claim 1 wherein said compound is o - hydroxystearylcarboxy - p - methyl-m-propylphenol.

References Cited

UNITED STATES PATENTS 2,215,142   9/1940   Wolfe _____ 260—48.85

DONALD E. CZAJA, *Primary Examiner.*

V. P. HOKE, *Assistant Examiner.*